United States Patent
Lim et al.

(10) Patent No.: US 6,501,238 B1
(45) Date of Patent: Dec. 31, 2002

(54) APPARATUS FOR CORRECTING MIS-CONVERGENCE AND GEOMETRIC DISTORTION IN DEFLECTION YOKE USING VARIABLE RESISTANCE

(75) Inventors: Sung Yong Lim, Uiwang-Shi (KR); Hwan Seok Choe, Suwon-Shi (KR); Jin Young Park, Suwon-Shi (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 09/952,970

(22) Filed: Sep. 14, 2001

(30) Foreign Application Priority Data

Jul. 25, 2001 (KR) ....................... P2001-44684

(51) Int. Cl.⁷ ................................. G09G 1/04
(52) U.S. Cl. ................. 315/402; 315/399; 315/370; 315/368.27; 315/368.11
(58) Field of Search .................. 315/364, 368.11, 315/368.25, 368.27, 368.28, 370, 399, 402, 400

(56) References Cited

U.S. PATENT DOCUMENTS

| | | | |
|---|---|---|---|
| 3,968,402 A | * 7/1976 | Sahara et al. | 315/370 |
| 5,070,280 A | * 12/1991 | Okuyama et al. | 313/412 |
| 5,079,486 A | * 1/1992 | Honda et al. | 315/371 |
| 5,142,205 A | * 8/1992 | Yabase et al. | 313/412 |
| 5,548,190 A | * 8/1996 | Okuyama et al. | 315/368.26 |
| 5,793,165 A | * 8/1998 | Hayashi et al. | 315/370 |
| 6,160,363 A | * 12/2000 | Sugimoto et al. | 315/368.28 |
| 6,215,257 B1 | 4/2001 | Choe | 315/368.28 |
| 6,285,141 B1 | * 9/2001 | Osawa | 313/440 |
| 6,359,397 B1 | * 3/2002 | Aoki | 315/364 |

* cited by examiner

Primary Examiner—Haissa Philogene
(74) Attorney, Agent, or Firm—Darby & Darby

(57) ABSTRACT

The present invention relates to a deflection yoke, and in particular, to an apparatus for correcting a mis-convergence and geometric distortion in a deflection yoke using a variable resistance, proving a more convenient way to adjust VCR by adjusting the current flowing in a comma-free coil using a variable resistance, instead of attaching a magnetic member as in the conventional method for the products associated with VCR (Vertial Green) properties.

16 Claims, 12 Drawing Sheets

Right Portion Magnetic Field Intensity

Left Portion Magnetic Field = Right Portion Magnetic Field

Left Portion Magnetic Field Intensity

Right Portion Magnetic Field Intensity

Left Portion Magnetic Field =
Right Portion Magnetic Field

Left Portion Magnetic Field Intensity

|  |  | CCW MAX | Difference between CCW MAX and 0° | CCW 70° | Difference between CCW 70° and 0° | 0° | CW 70° | Difference between CW 70° and 0° | CW MAX | Difference between CW MAX and 0° |
|---|---|---|---|---|---|---|---|---|---|---|
| C/G | XH | 0.03 | 0.02 | 0.02 | 0.01 | 0.01 | 0.05 | 0.04 | 0.02 | 0.01 |
|  | YH | 0.07 | -0.04 | 0.09 | -0.02 | 0.11 | 0.15 | 0.04 | 0.23 | 0.12 |
|  | XV | 0.01 | -0.01 | 0.01 | -0.01 | 0.02 | 0.01 | -0.01 | 0.04 | 0.02 |
|  | YV | -0.02 | 0.00 | -0.03 | -0.01 | -0.02 | -0.02 | 0.00 | -0.01 | 0.01 |
|  | HCR | -0.07 | 0.00 | -0.07 | 0.00 | -0.07 | -0.06 | 0.01 | -0.07 | 0.00 |
|  | VCR | -0.40 | -0.36 | -0.09 | -0.05 | -0.04 | 0.01 | 0.05 | 0.27 | 0.31 |
|  | C-VCR | -0.34 | -0.28 | 0.01 | 0.07 | -0.06 | 0.00 | 0.06 | 0.19 | 0.25 |
|  | D-VCR | 0.06 | 0.08 | 0.00 | 0.02 | -0.02 | -0.01 | 0.01 | -0.08 | -0.06 |
| L/D | CXA | 0.0 | -6.2 | 6.5 | 0.3 | 6.2 | 6.2 | 0.0 | 4.8 | -1.4 |
|  | CYA | 6.2 | -0.8 | 7.0 | 0.0 | 7.0 | 6.2 | -0.8 | 0.0 | -7.0 |
|  | YTB | 4.8 | 3.3 | 1.0 | -0.5 | 1.5 | 0.5 | -1.0 | -6.0 | -7.5 |
|  | YLR | -0.5 | -2.0 | 1.0 | -0.5 | 1.5 | 1.5 | 0.0 | 2.0 | 0.5 |
| V-SIZE |  | 239 | -1.0 | 240 | 0.0 | 240 | 239 | -1.0 | 237 | -3.0 |
| G/D | T3 | 0.24 | 0 | 0.24 | 0 | 0.24 | 0.24 | 0 | 0.24 | 0 |
|  | T4 | -0.24 | 0 | -0.24 | 0 | -0.24 | -0.24 | 0 | -0.24 | 0 |

APPARATUS FOR CORRECTING MIS-CONVERGENCE AND GEOMETRIC DISTORTION IN DEFLECTION YOKE USING VARIABLE RESISTANCE

BACKGROUND OF THE INVENTION

1. Field of the Invention

The present invention relates to a deflection yoke. In particular, the present invention relates to an apparatus for correcting mis-convergence and geometric distortion in a deflection yoke using a variable resistance in order to have a better control on VCR properties of a product by controlling current in a comma-free state, which is regarded very distinctive from the typical method of attaching a iron plate to a product.

2. Description of the Prior Art

In general, a deflection yoke 10, as shown in FIG. 1, is installed at a neck portion 110 of a cathode-ray tube 100. According to a winding configuration, it is divided into a saddle-saddle type defection yoke as shown in FIGS. 2 and 3, and a saddle-toroidal type deflection yoke as shown in FIGS. 4 and 5. The deflection yoke deflects electron beams emitted from a BGR electron gun 120 installed at the cathode-ray tube in a neck portion 110 to all directions, e.g., the left and right sides, and up and down, thereby making the electron beams collide with a precise position on a fluorescent screen of the cathode-ray tube.

FIGS. 2 and 3 show a saddle-saddle type deflection yoke in accordance with the related art. As shown in the Figures, a saddle type horizontal deflection coil 12a and 12b is installed at the top/bottom of inner periphery of screen portion in a conical-shaped coil separator 11, and a saddle type vertical deflection coil 13a and 13b on the left/right of outer periphery. Electrically, the saddle type deflection coils are serially connected in the order of upper left 13a-1, lower left 13a-2, upper right 13b-1, and lower right 13b-2 (See FIG. 6).

In order to enhance a magnetic field of the vertical deflection coils 13a and 13b, a conical ferrite core 14 is installed at the outer periphery of the screen portion in the coil separator 11. Also, comma-free coil 15 are installed around the outer periphery of a neck portion in the coil separator 11 to improve comma aberration generated by the vertical deflection coils 13a and 13b.

FIGS. 4 and 5 show a saddle-toroidal type deflection yoke according to the related art. As shown in the figures, a horizontal deflection coil 12 is installed at the upper/lower portion of a inner periphery of a screen in a conical coil separator 11, a conical ferrite core 14 is installed at the outer periphery, and a toroidal type vertical deflection coil 16 is wound around the upper/lower portion of the ferrite core 14.

In addition, around the outer periphery of the neck portion of the coil separator 11, comma-free coils 15 are additionally installed in order to improve a comma aberration generated by the vertical deflection coil 16. The vertical deflection coil 16 is wound around the upper/lower portion of the ferrite core 14.

In case of a saddle-saddle type deflection yoke illustrated in FIGS. 2 and 3, depending on the relative dispersion and/or relative current intensity between the left vertical deflection coil 13a and the right deflection coil 13b, a magnetic field may differ on the left side and the right side. This difference in a magnetic field is main factor that causes mis-convergence and geometric distortion (hereinafter, it is abbreviated as G/D).

Similarly, a saddle-toroidal deflection yoke illustrated in FIGS. 4 and 5, depending on the relative dispersion and/or relative current intensity between the vertical defection coil 16a being wound around the upper left and lower left portion in X and Y-axes and the vertical deflection coil 16b being wound around the upper right and lower right portion, a magnetic field may (differ on the left side and the right side. Again, this difference in a magnetic field causes mis-convergence and G/D on the screen.

There are two types of the mis-convergence, that is, YV mis-convergence and YHC mis-convergence. The YV mis-convergence, as shown in FIGS. 7 and 9, indicates a point where a red horizontal line R crosses a blue horizontal line B at the upper and lower portions of Y-axis on a screen. In the meantime, the YHC mis-convergence, as shown in FIG. 10, indicates a point where a vertical line R and a vertical line B meets each other. The G/D is a state that a screen is distorted from a normal shape (See FIGS. 6a and 13), and in particular, as FIGS. 11 and 13 illustrate, it sometimes does a trapezoid distortion.

FIG. 14 is an auxiliary circuit of YV mis-convergence of the saddle-saddle type deflection yoke illustrated in FIGS. 2 and 3. As shown in the figure, the left vertical deflection coil 13a and the right deflection coil 13b are electrically connected in series. And, to the left/right vertical deflection coils 13a and 13b, connected in parallel is a differential type of distribution circuit comprising two-fixed resistance 21a and 21b and a variable resistance 22.

According to the conventional YV mis-convergence auxiliary circuit in FIG. 14, by adjusting the variable resistance 22 and a magnetic field, which is generated by adjusting relative current intensity in the left vertical deflection coil 13a and the right vertical deflection coil 13b, YV mis-convergence illustrated in FIG. 7 or 9 is corrected as shown in FIG. 8, wherein the line R and the line B are concordant.

FIG. 15 is an auxiliary circuit of YV mis-convergence of the saddle-toroidal type deflection yoke illustrated in FIGS. 4 and 3b. As shown, the upper left vertical deflection coil 16a-1, the lower left vertical deflection coil 16b-1, the upper right vertical deflection coil 16a-2, and the lower right vertical deflection coil 16b-2 are serially connected in order. And, to the vertical deflection coils 16a-1 and 16b-1 wound around the upper left-lower left portion and the vertical deflection coils 16a-2 and 16b-2 wound around the upper right-lower right portion, connected in parallel is a differential type of distribution circuit comprised of two-fixed resistance 21a and 21b and a variable resistance 22.

Similar to the YV mis-convergence auxiliary circuit illustrated in FIG. 14, the conventional YV mis-convergence auxiliary circuit in FIG. 15, by adjusting the variable resistance 22 and a magnetic field of the left/right portion, which is generated by adjusting relative current intensity flowing in the vertical deflection coils 16a-1 and 16b-1 wound around the upper left and lower left portions and the vertical deflection coils 16a-2 and 16b-2 wound around the upper right and lower right portions, corrects the YV mis-convergence illustrated in FIG. 7 or 9 to be the same with that in FIG. 8, that is, the line R and the line B are concordant.

However, in case of a saddle-saddle type and/or a saddle-toroidal type, when YV mis-convergence is corrected by using the variable resistance 22, G/D pattern as well as convergence pattern are changed depending on the differences between the left/right portion magnetic field due to the changes in the relative current intensity flowing in the vertical deflection coil 13a or 16a positioned on the left portion and the vertical deflection coil 13b or 16a positioned on the right portion. Therefore, it is always possible that a new G/D is generated even though YV mis-convergence may have been corrected.

Moreover, G/D can be generated by dispersion difference of the left and the right vertical deflection coils that sometimes occurs during winding. That is, due to the unbalanced wound coil and dispersion difference by a mechanical configuration, it is practically very difficult to wind the coils around 1 through 4 upper portions in X and Y-axes to form a perfectly symmetric magnetic field. Hence, although a mis-convergence shown in FIG. 5 caused by the unbalanced dispersion may have been perfectly corrected, G/D illustrated in FIG. 11 or 13 can be generated. And, as shown in FIG. 12, although G/D can be perfectly corrected, a mis-convergence illustrated in either FIG. 7 or FIG. 9 can be generated at any time. Therefore, the conventional YV mis-convergence auxiliary circuit shown in FIGS. 14 and 15 cannot correct a mis-convergence and G/D at the same time.

On the other hand, in case of the typical deflection yoke used in a television, since the television screen exhibits moving pictures, G/D was not regarded as a critical problem, and convergence was primarily adjusted by using a circuit illustrated in FIGS. 14 and 15. However, in case of a recently developed personal computer, since the monitor has to show accurate still images, a deflection yoke is required to have a more accurate convergence and improved G/D.

In order to meet the requirements described above, a new technique is introduced (See FIG. 17). Here, the vertical deflection on the left portion 13a and the vertical deflection on the right portion 13b are connected in series and the coils 13a and 13b are installed at the left and the right side of outer periphery of the screen portion in a coil separator.

To the left vertical deflection coil 13a and the right deflection coil 13b, connected in parallel is a differential type distribution circuit portion 40. The differential type of distribution circuit portion 40 is comprised of a first fixed resistance R1, a first variable resistance VR1, and a second fixed resistance R1 being connected in series, and a moving electrode end of the first variable resistance VR1 and the first and the second vertical deflection coils being connected to a common contact point.

The differential type distribution circuit portion 40 controls a relative current intensity flowing in the left vertical deflection coil 13a and the right deflection coil 13b, and adjusts G/D on a screen, thereby being called a distortion adjusting portion.

In addition, a first through sixth comma-free coils 51–56 are serially connected to the left and right deflection coils 13a and 13b. The comma-free coils 51–56 are electrically connected in series to each other and simultaneously, as shown in FIGS. 18 and 19, they are wound around the upper left, upper right, lower left, lower right, middle left and middle right portions of outer periphery of a neck portion in the coil separator using an E-shaped magnetic member 58 as a medium, thereby generating 6 electrode magnetic fields to correct comatic aberration.

Unfortunately, the conventional technique described above has a problem of mis-convergence, particularly, in VCR(Vertical Center Raster). In detail, VCR is a vertical mis-convergence involving the center of "Red" and "Blue" and the center of "Green" at the upper and lower portions on the Y-axis.

Since initial value of the VCR is predetermined as adjusting designs and properties of coils for winding, the VCR characteristics are taken into account only deflection yoke properties are concerned, and the VCR of a tube stays the same all the time without any change. However, in some cases, the initial VCR values are dispersed by several variables (e.g., changes of coil dispersion, element dispersion etc.) during a production procedure.

So far, in order to compensate changeability of the VCR, many attempts have been made. One of them was attaching a magnetic member (made of permaloid 5*15*0.5t, 5*20*0.5t) to the upper and lower portions and on the left and right portions of a deflection yoke to adjust VCR (approximately, ±0.04 mm).

However, the above-described method takes place after a deflection yoke is completed and additional work for the attachment of the magnetic member has to be done and extra elements like a magnetic member and glue are required.

SUMMARY OF THE INVENTION

It is, therefore, an object of the present invention to provide an apparatus for correcting mis-convergence and geometric distortion in a deflection yoke by using a variable resistance in order to have a better control on VCR by adjusting the current flowing in a comma-free coil, without attaching a magnetic member as in a conventional apparatus.

To achieve the above object, an apparatus for correcting a mis-convergence and geometric distortion in a deflection yoke using a variable resistance, comprising a conical-shaped coil separator including a neck portion and a screen section; an upper horizontal deflection coil and a lower horizontal deflection coil installed to be electrically connected to each other at an upper and lower portions of inner periphery of the screen portion in the coil separator; a left vertical deflection coil and a right vertical deflection coil installed to be electrically connected to each other at an upper and lower portions of outer periphery of the screen portion in the coil separator; a conical-shaped ferrite core installed at outer periphery of the screen portion in the coil separator to enhance a magnetic field of the vertical deflection coil;

a plurality of comma-free coils installed at the neck portion of the coil separator to be electrically connected to the vertical deflection coil for generating a pincushion magnetic field, thereby canceling a barrel magnetic field generated by the left and right vertical deflection coils; a distortion adjusting portion for correcting geometric distortion on a screen by adjusting a relative current flowing in the left and right vertical deflection coils and thereby, adjusting a relative magnetic field in the left and right sides; a first convergence adjusting portion for correcting a vertical mis-convergence on a screen by adjusting a relative current flowing in the comma-free coils at the middle left portion and the middle right portion and thereby, adjusting a relative magnetic field in the left and right sides; a second convergence adjusting portion for correcting a horizontal mis-convergence on a screen by adjusting a relative current flowing in the comma-free coils at the upper portion and the lower portion and thereby, adjusting a relative magnetic field in the upper and lower sides; and a vertical center raster mis-convergence adjusting portion, comprising variable resistance connected to the comma-free coils in parallel, and fixed resistance connected to a common contact point of the left and right comma-free coils and a moving electrode of the variable resistance.

It is desirable that the variable resistance in the vertical center raster mis-convergence adjusting portion is in a range of from 5 to 10Ω.

Also, an apparatus for correcting a mis-convergence and geometric distortion in a deflection yoke using a variable resistance, comprising a conical-shaped coil separator including a neck portion and a screen section; an upper horizontal deflection coil and a lower horizontal deflection coil installed to be electrically connected to each other at an upper and lower portions of inner periphery of the screen portion in the coil separator; a left vertical deflection coil and a right vertical deflection coil installed to be electrically connected to each other at an upper and lower portions of outer periphery of the screen portion in the coil separator; a conical-shaped ferrite core installed at outer periphery of the screen portion in the coil separator to enhance a magnetic field of the vertical deflection coil; a plurality of comma-free coils installed at the neck portion of the coil separator to be electrically connected to the vertical deflection coil for generating a pin-cushion magnetic field, thereby canceling a barrel magnetic field generated by the left and right vertical deflection coils; a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising variable resistance connected to the comma-free coils in parallel, and fixed resistance connected to a common contact point of the left and right comma-free coils and a moving electrode of the variable resistance.

It is desirable that the variable resistance connected to the comma-free coils in parallel, and fixed resistance connected to a common contact point of the left and right comma-free coils and a moving electrode of the variable resistance.

Further, an apparatus for correcting a mis-convergence and geometric distortion in a deflection yoke using a variable resistance, comprising a conical-shaped coil separator including a neck portion and a screen section; an upper horizontal deflection coil and a lower horizontal deflection coil installed to be electrically connected to each other at an upper and lower portions of inner periphery of the screen portion in the coil separator; a left vertical deflection coil and a right vertical deflection coil installed to be electrically connected to each other at an upper and lower portions of outer periphery of the screen portion in the coil separator; a conical-shaped ferrite core installed at outer periphery of the screen portion in the coil separator to enhance a magnetic field of the vertical deflection coil; a plurality of comma-free coils installed at the neck portion of the coil separator to be electrically connected to the vertical deflection coil for generating a pin-cushion magnetic field, thereby canceling a barrel magnetic field generated by the left and right vertical deflection coils; a distortion adjusting portion for correcting geometric distortion on a screen by adjusting a relative current flowing in the left and right vertical deflection coils and thereby, adjusting a relative magnetic field in the left and right sides; a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising variable resistance connected to the comma-free coils in parallel, and fixed resistance connected to a common contact point of the left and right comma-free coils and a moving electrode of the variable resistance.

It is desirable that the variable resistance in the vertical center raster is in a range of from 5 to 10Ω.

Further more, an apparatus for correcting a mis-convergence and geometric distortion in a deflection yoke using a variable resistance, comprising a conical-shaped coil separator including a neck portion and a screen section; an upper horizontal deflection coil and a lower horizontal deflection coil installed to be electrically connected to each other at an upper and lower portions of inner periphery of the screen portion in the coil separator; a conical-shaped ferrite core installed at outer periphery of the screen portion in the coil separator to enhance a magnetic field of the vertical deflection coil; upper and lower left vertical deflection coils and upper and lower right vertical deflection coils wound around the ferrite core to be electrically connected for generating vertical deflection magnetic fields at the upper and lower portions; a plurality of comma-free coils installed at the neck portion of the coil separator to be electrically connected to the vertical deflection coil for generating a pin-cushion magnetic field, thereby canceling a barrel magnetic field generated by the left and right vertical deflection coils; a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising variable resistance connected to the comma-free coils in parallel, and fixed resistance connected to a common contact point of the left and right comma-free coils and a moving electrode of the variable resistance.

It is desirable that the variable resistance in the vertical center raster is in a range of from 5 to 10Ω.

Further more, an apparatus for correcting a mis-convergence and geometric distortion in a deflection yoke using a variable resistance, comprising a conical-shaped coil separator including a neck portion and a screen section; an upper horizontal deflection coil and a lower horizontal deflection coil installed to be electrically connected to each other at an upper and lower portions of inner periphery of the screen portion in the coil separator; a left vertical deflection coil and a right vertical deflection coil installed to be electrically connected to each other at an upper and lower portions of outer periphery of the screen portion in the coil separator; a conical-shaped ferrite core installed at outer periphery of the screen portion in the coil separator to enhance a magnetic field of the vertical deflection coil; a plurality of comma-free coils installed at the neck portion of the coil separator to be electrically connected to the vertical deflection coil for generating a pin-cushion magnetic field, thereby canceling a barrel magnetic field generated by the left and right vertical deflection coils; a distortion adjusting portion for correcting geometric distortion on a screen by adjusting a relative current flowing in the left and right vertical deflection coils and thereby, adjusting a relative magnetic field in the left and right sides; a first convergence adjusting portion for correcting a vertical mis-convergence on a screen by adjusting a relative current flowing in the comma-free coils at the middle left portion and the middle right portion and thereby, adjusting a relative magnetic field in the left and right sides; a second convergence adjusting portion for correcting a horizontal mis-convergence on a screen by adjusting a relative current flowing in the comma-free coils at the upper portion and the lower portion and thereby, adjusting a relative magnetic field in the upper and lower sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

It is desirable that the variable resistance in the vertical center raster is in a range of from 5 to 10Ω.

Further more, an apparatus for correcting a mis-convergence and geometric distortion in a deflection yoke using a variable resistance, the apparatus comprising: a conical-shaped coil separator including a neck portion and a screen section; an upper horizontal deflection coil and a lower horizontal deflection coil installed to be electrically connected to each other at an upper and lower portions of inner periphery of the screen portion in the coil separator; a left vertical deflection coil and a right vertical deflection coil installed to be electrically connected to each other at an upper and lower portions of outer periphery of the screen portion in the coil separator; a conical-shaped ferrite core installed at outer periphery of the screen portion in the coil separator to enhance a magnetic field of the vertical deflection coil; a plurality of comma-free coils installed at the neck portion of the coil separator to be electrically connected to the vertical deflection coil for generating a pin-cushion magnetic field, thereby canceling a barrel magnetic field generated by the left and right vertical deflection coils; a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

It is desirable that the variable resistance in the vertical center raster is in a range of from 5 to 10Ω.

Further more, an apparatus for correcting a mis-convergence and geometric distortion in a deflection yoke using a variable resistance, comprising a conical-shaped coil separator including a neck portion and a screen section; an upper horizontal deflection coil and a lower horizontal deflection coil installed to be electrically connected to each other at an upper and lower portions of inner periphery of the screen portion in the coil separator; a left vertical deflection coil and a right vertical deflection coil installed to be electrically connected to each other at an upper and lower portions of outer periphery of the screen portion in the coil separator; a conical-shaped ferrite core installed at outer periphery of the screen portion in the coil separator to enhance a magnetic field of the vertical deflection coil; a plurality of comma-free coils installed at the neck portion of the coil separator to be electrically connected to the vertical deflection coil for generating a pin-cushion magnetic field, thereby canceling a barrel magnetic field generated by the left and right vertical deflection coils;

a distortion adjusting portion for correcting geometric distortion on a screen by adjusting a relative current flowing in the left and right vertical deflection coils and thereby, adjusting a relative magnetic field in the left and right sides; a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

It is desirable that the variable resistance in the vertical center raster is in a range of from 5 to 10Ω.

Further more, an apparatus for correcting a mis-convergence and geometric distortion in a deflection yoke using a variable resistance, comprising a conical-shaped coil separator including a neck portion and a screen section; an upper horizontal deflection coil and a lower horizontal deflection coil installed to be electrically connected to each other at an upper and lower portions of inner periphery of the screen portion in the coil separator; a conical-shaped ferrite core installed at outer periphery of the screen portion in the coil separator to enhance a magnetic field of the vertical deflection coil; upper and lower left vertical deflection coils and upper and lower right vertical deflection coils wound around the ferrite core to be electrically connected for generating vertical deflection magnetic fields at the upper and lower portions; a plurality of comma-free coils installed at the neck portion of the coil separator to be electrically connected to the vertical deflection coil for generating a pin-cushion magnetic field, thereby canceling a barrel magnetic field generated by the left and right vertical deflection coils; a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

It is desirable that variable resistance in the vertical center raster is in a range of from 5 to 10Ω.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
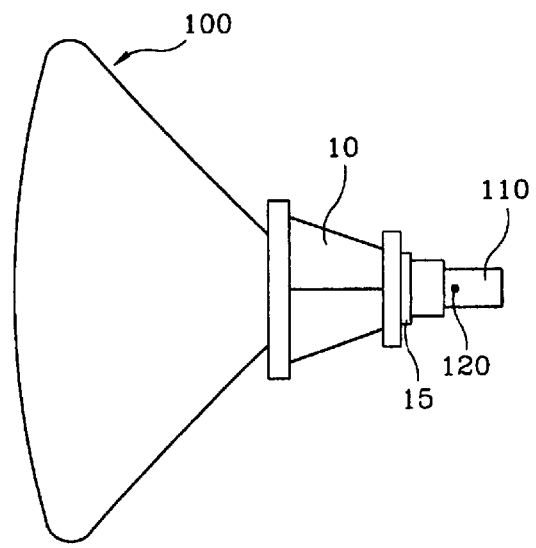
FIG. 1 is a diagram illustrating a cathode-ray tube where a deflection yoke is installed according to an embodiment of a conventional apparatus.
Figure 2:
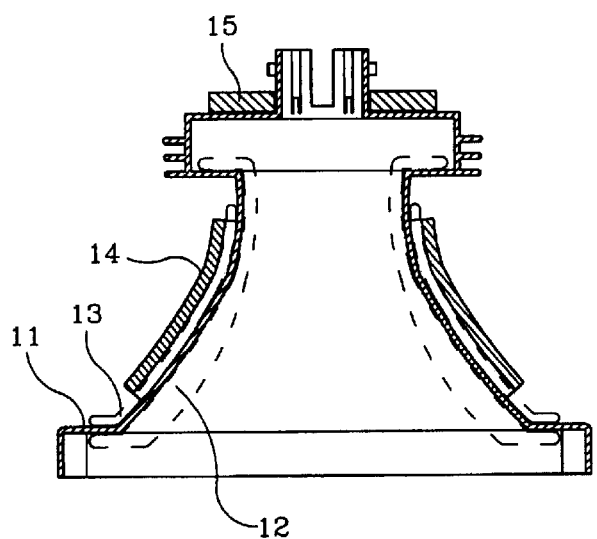
FIG. 2 is a vertical-sectional view of a saddle-saddle type deflection yoke according to an embodiment of a conventional apparatus.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Before getting into more details on the present invention, it might be helpful to go back to the technical background of the related art briefly. Typically, a magnetic member was used in order to correct mis-convergence in the related art because the magnitude of a magnetic field was changed depending on an attached magnetic field member, which consequently varied a deflection angle of an electron beam.

In addition, a comma-free coil was additionally added to correct mis-convergence generated in a deflection yoke because the magnetic field variance could be easily accomplished in a more practical sense by differentiating current flow in a deflection yoke to generate a magnetic field.

For the same cause aforementioned, the present invention was introduced based on the principle that a practical magnetic field change can be brought by varying current intensity flowing in a comma-free coil.

An embodiment of the present invention is now explained with reference of FIG. 20. As shown in the figure, a left vertical deflection coil 13a and the right vertical deflection coil 13b are electrically connected to each other in series at the left and right sides of outer periphery of a screen portion in a coil separator, respectively.

A differential type of distribution circuit portion 40 is connected in parallel to the left vertical deflection coil 13a and the right vertical deflection coil 13b. The differential type of distribution circuit portion 40 is comprised of a first fixed resistance R1, a first variable resistance VR1, and a second fixed resistance R1 being connected in series, and a moving electrode end of the first variable resistance VR1 and the first and the second vertical deflection coils being connected to a common contact point.

The differential type of distribution circuit portion 40 controls a relative current intensity flowing in the left vertical deflection coil 13a and the right deflection coil 13b, and adjusts G/D on a screen, thereby being called a distortion adjusting portion.

Figure 18:
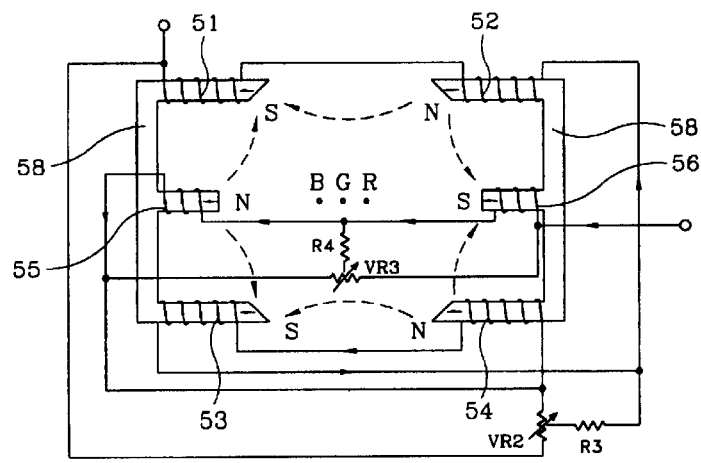
FIGS. 18 and 19 are schematic diagrams of a comma-free coil according to a preferred embodiment of the present invention.
Figure 19:
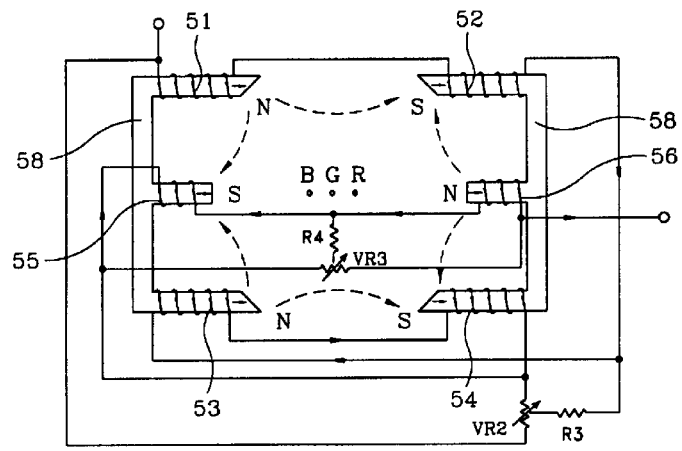

In addition, a first through sixth comma-free coils 51–56 are serially connected to the left and right deflection coils 13a and 13b. The comma-free coils 51–56 are electrically connected in series each other and simultaneously, as shown in FIGS. 18 and 19, they are wound around the upper left, upper right, lower left, lower right, middle left and middle right portions of outer periphery of a neck portion in the coil separator using an E-shaped magnetic member 58 as a medium, thereby resulting 6 electrode magnetic fields for correcting comatic aberration.

Thus far, the above-described configuration is taken from the conventional apparatus. However, the present invention further comprises a first current adjusting resistance CR1, one end of the resistance being connected to a contact point of the right vertical deflection coil 13b and a first comma-free coil 51 and the other end of the resistance being connected to a contact point of a fourth comma-free coil 54 and a fifth comma-free coil 55, a second current adjusting resistance CR 2, one end of the resistance being connected to a contact point of the fourth comma-free coil 54 and the fifth comma-free coil 55 and the other end being connected to a contact point of a sixth comma-free coil 56 and a power supply source.

Figure 3:
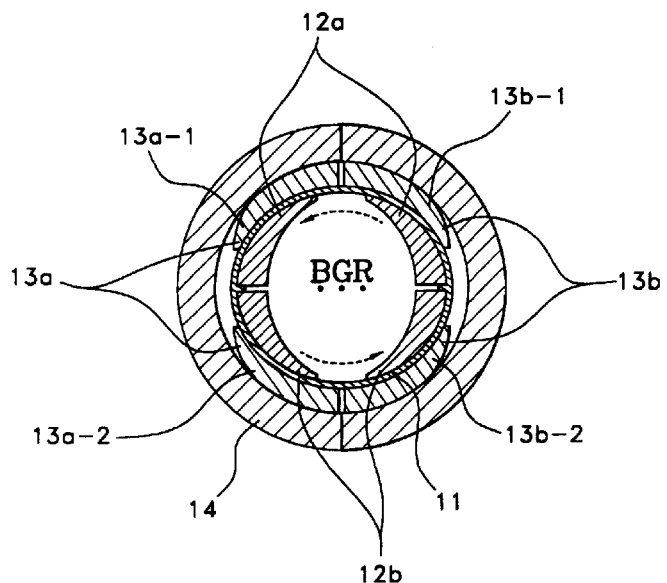
FIG. 3 is a horizontal-sectional view of FIG. 2.
Figure 4:
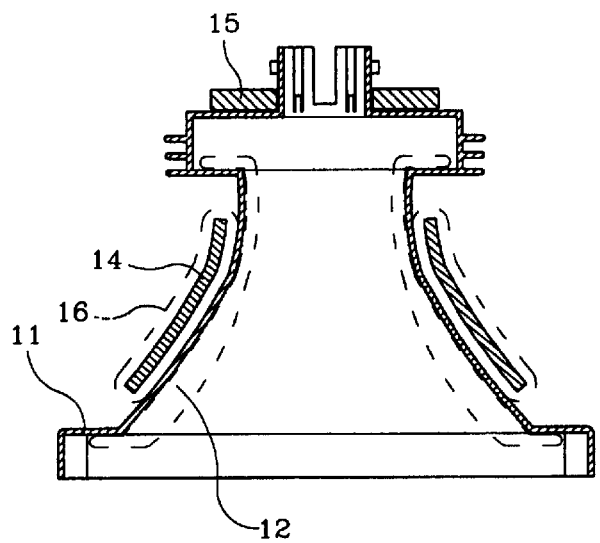
FIG. 4 is a vertical-sectional view of a saddle-toroidal type deflection yoke according to an embodiment of a conventional apparatus.
Figure 5:
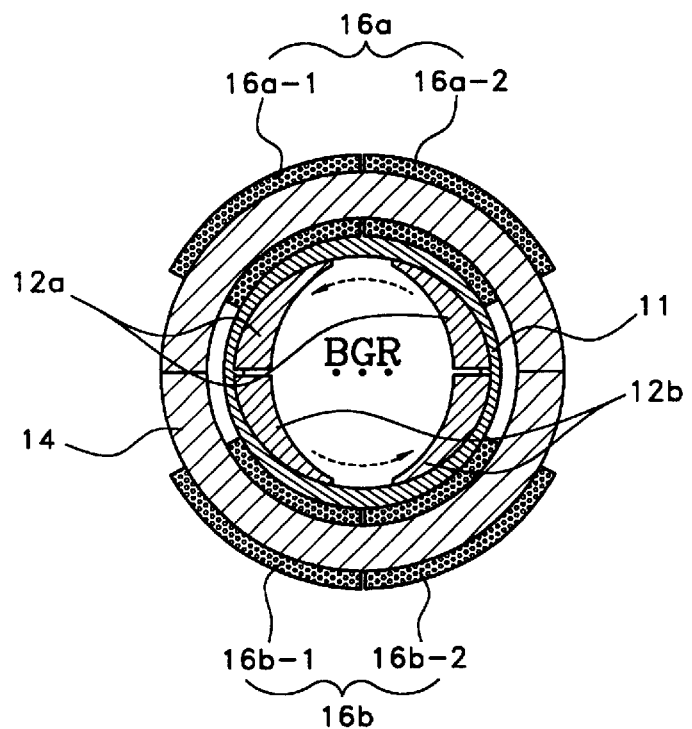
FIG. 5 is a horizontal-sectional view of FIG. 4.
Figure 6:
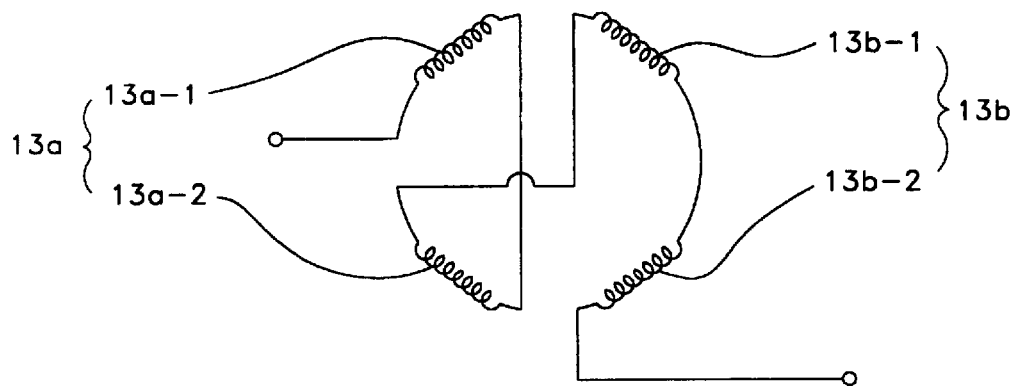
FIG. 6 is a circuit diagram illustrating electrical connection relationship between the vertical deflection coils in FIGS. 2 and 3.

Since the magnetic field generated by the vertical deflection coils 13a and 13b takes a barrel shape, as indicated in FIG. 3 by an arrow, during the deflecting process at the upper and lower portions, the comparatively lower sensitivity of G-beam being located far from the magnetic field than that of R-beam and B-beam fails to converge, and this consequently generates a mis-convergence comma. Therefore, in order for the G-beam to be converged to the R-beam and the B-beam, comma-free coils 51–56 shown in FIGS. 18 and 19 are used and they generate a pin-cushion magnetic field, indicated by a dotted line in the figures, thereby improving the sensitivity of the G-beam by canceling the barrel-shaped magnetic filed generated by the vertical deflection coils 13a and 13b.

Although it is preferable to wind the comma-free coils 51–56 to the same direction, the upper portion comma-free coils 51 and 52 and the lower portion comma-free coils 53 and 54 could be wound to the same direction, while the middle portion comma-free coils 55 and 56 being wound to the opposite direction. In a former case that the coils are wound to the same direction, if the magnetic field of the middle portion of comma-free coil 55 or 56 gets stronger, that of the upper portion of comma-free coil 51 or 52 and the lower portion of comma-free coil 53 or 54 could be weaken to the contrary. For example, if the middle left comma-free coil 55 generates a stronger magnetic field, this could weaken the magnetic field around the upper left and lower left portions of comma-free coils 51 and 53 and strengthen the magnetic field around the upper right and lower right portions comma-free coils 52 and 54. On the other hand, in the latter case, the magnetic fields are generated contrary to the former case.

In reference, FIG. 18 indicates a current flow direction and magnetic field direction of comma-free coils during deflecting to a lower portion. Meanwhile, FIG. 19 indicates a current flow direction and magnetic field direction of comma-free coils during deflecting to an upper portion. From the figures, it is discovered that the current and magnetic field in the deflection of the upper portion and lower portion, respectively, flow to the opposite side from each other.

Figure 20:
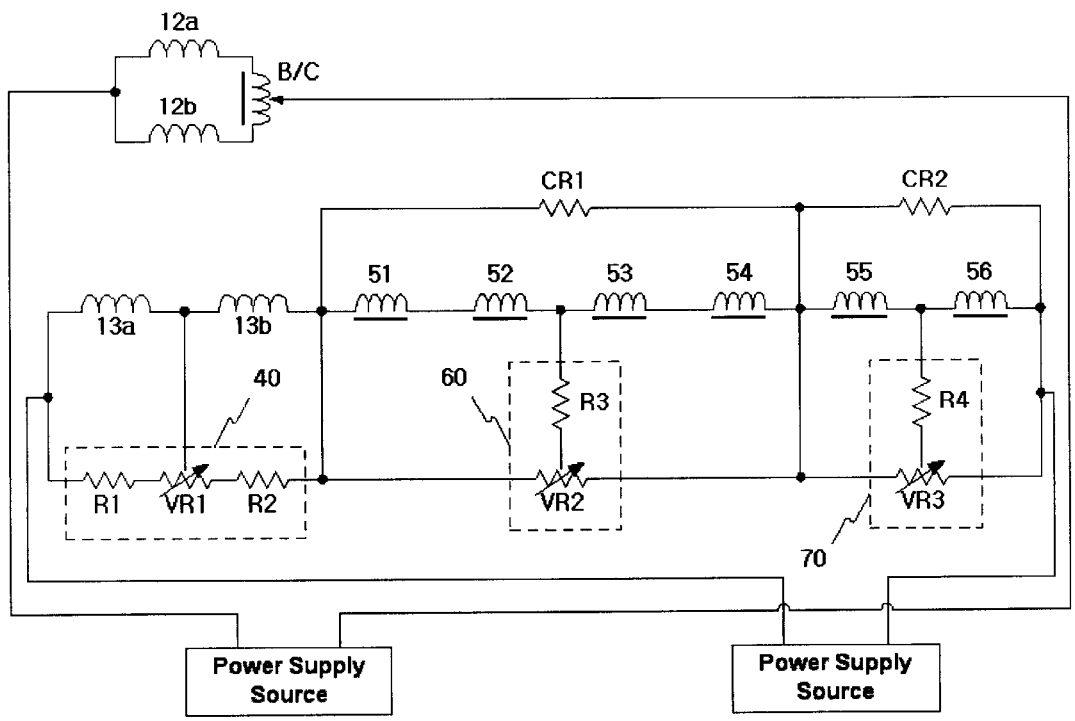
FIG. 20 is an embodiment for explaining the technical background of the present invention.

Again in FIG. 20, YHC mis-convergence adjusting portion 60 is connected in parallel to the first through fourth comma-free coils 51–54. The YHC mis-convergence adjusting portion 60 controls a relative current flowing in the first and second comma-free coils 51 and 52 and the third and fourth comma-free coils 53 and 54, in order to correct a mis-convergence on a screen. Also, it is comprised of a second variable resistance VR2 being connected in parallel to the first through fourth comma-free coils 51–54, and a third fixed resistance R3 being connected between a contact point of the second and third comma-free coils 52 and 53 and a moving electrode of the second variable resistance VR2.

YV mis-convergence adjusting portion 70 is connected in parallel to the fifth and sixth comma-free coils 55 and 56. The YV mis-convergence adjusting portion 70 controls a vertical mis-convergence on a screen by controlling a relative current flowing in the fifth and sixth comma-free coils 55 and 56, in order to correct a vertical mis-convergence on a screen. Also, it is comprised of a third variable resistance VR3 being connected in parallel to the fifth and sixth comma-free coils 55 and 56, and a fourth fixed resistance R4 being connected between a contact point of the fifth and sixth comma-free coils 55 and 56 and a moving electrode of the third variable resistance VR3.

Furthermore, the present invention comprises two parallel-connected horizontal deflection coils 12a and 12b at an upper portion and a lower portion, respectively. And, there is a balance coil (B/C) for adjusting a relative magnetic field around the upper and lower deflection coils 12a and 12b.

Here, depending the magnitude of the first current adjusting resistance CR1 and the second current adjusting resistance CR2, the magnitude of the pin-cushion magnetic field generated by the first through sixth comma-free coils 51–56 varies, and the magnitudes of the first and second current adjusting resistance CR1 and CR2 are adjusted according to the state of a mis-convergence on a screen.

Through the first current adjusting resistance CR1 and the second current adjusting resistance CR2, the mis-convergence associated with the above-described VCR could be corrected. However, in a practical sense, the embodiment illustrated in FIG. 20 in which the first current adjusting resistance CR1 and the second current adjusting resistance CR2 are added after the first through third variable resistance are completely operated, does not demonstrate much improved work efficiency in comparison with the conventional method of attaching a magnetic member.

Figure 21:
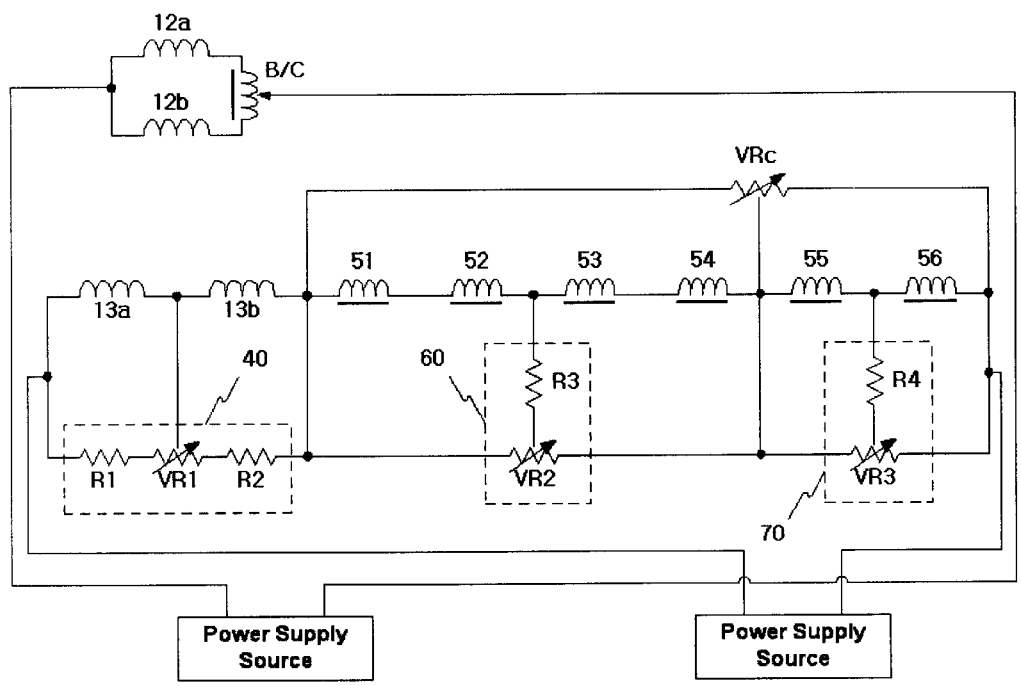
FIG. 21 illustrates an apparatus for complementing mis-convergence and geometric distortion of a deflection yoke using a variable resistance according to an embodiment of the present invention.

Therefore, the present invention suggests another embodiment shown in FIG. 21 using a variable resistance.

FIG. 21 illustrates an apparatus for correcting a mis-convergence and geometric distortion in a deflection yoke by using a variable resistance according to the present invention. In general, the configuration here is pretty similar to that of the conventional one shown in FIG. 17. However, it is different in view that a current adjusting variable resistance VRc is connected parallel to the first through sixth comma-free coils 51–56, and a contact point of the fourth comma-free coil 54 and the fifth comma-free coil 55 and a moving electrode of the current adjusting variable resistance VRc are connected to each other.

The operation of the above embodiment is the same with that of the conventional method or the embodiment illustrated in FIG. 29, except that during the process, VCR mis-convergence is corrected by adjusting the predetermined current adjusting variable resistance VRc instead of adding the first current adjusting resistance CR1 and the second current adjusting resistance CR2 as illustrated in FIG. 20.

Figure 22:
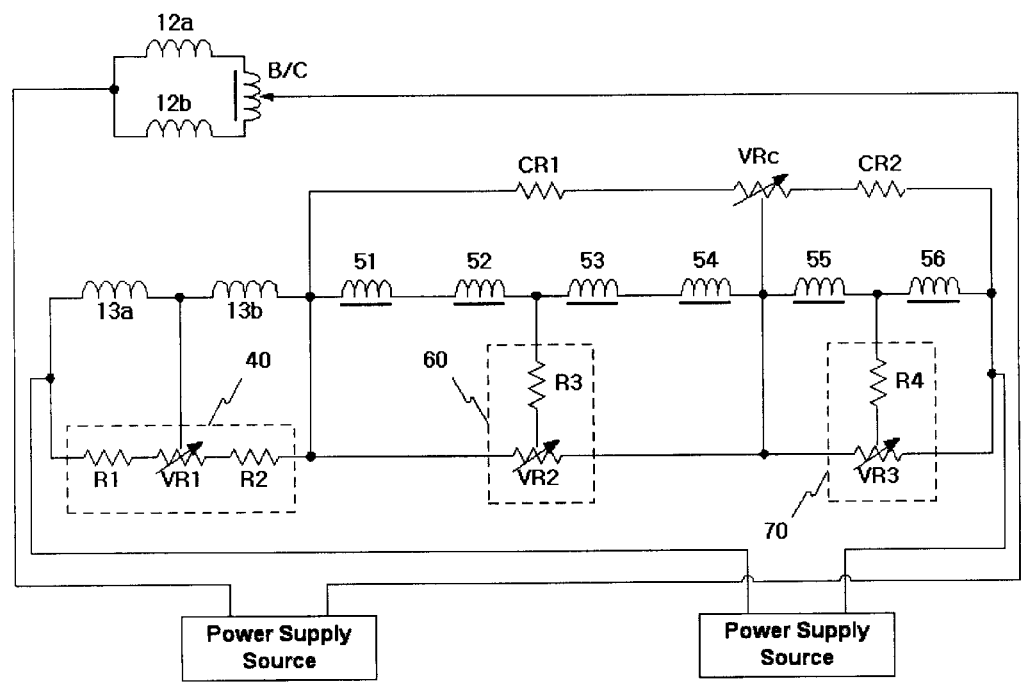
FIG. 22 illustrates an apparatus for complementing mis-convergence and geometric distortion of a deflection yoke using a variable resistance according to another embodiment of the present invention.

Still another aspect of the present invention provides another embodiment shown in FIG. 22, a technical combination of the embodiments of FIGS. 20 and 21. The embodiment illustrated in FIG. 22 is provided to conduct a more accurate correction through a current adjusting variable resistance VRc after a current adjusting resistance for a general VCR correction is first applied.

Figure 17:
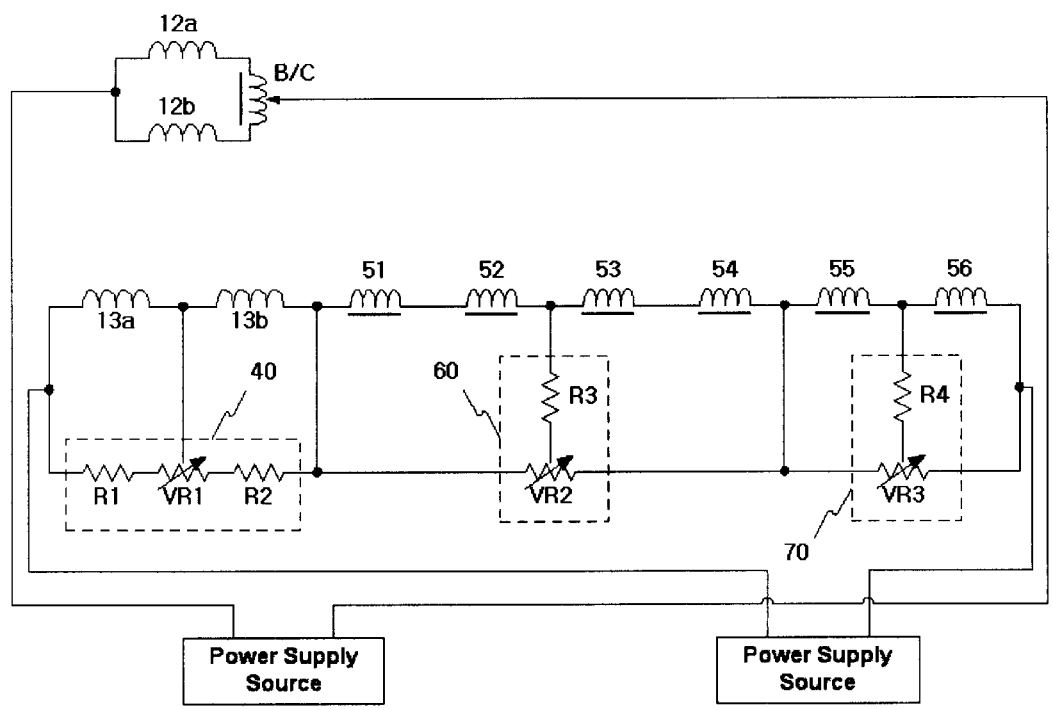
FIG. 17 is a circuit diagram of an apparatus for complementing mis-convergence and geometric distortion of a saddle-saddle type deflection yoke according to an embodiment of the present invention.

In basis of the conventional configuration shown in FIG. 17, the embodiment shown in FIG. 22 further comprises: a first current adjusting resistance CR1, one end being connected to a contact point of a right vertical deflection coil 13b and a first comma-free coil 51; a second current adjusting resistance CR2, one end being connected to a contact point of a sixth comma-free coil 56 and a power supply source; and a current adjusting variable resistance VRc, one end being connected to the other end of the first current adjusting resistance CR1 and another end being connected to the other end of the second current adjusting resistance CR2. In addition, a common contact point of the fourth and fifth comma-free coils 54 and 55 is connected to a moving electrode of the current adjusting variable resistance VRc.

The following embodiments are based on the embodiment of FIG. 21.

More detailed elements employed in the embodiments of the present invention are now explained.

That is, R1 and R2 are from about 80 to about 120 Ohm, R3 is from about 2.0 to about 2.4 Ohm, R4 is from about 0.3 to about 0.7 Ohm, the first variable resistance VR1 is from about 80 to about 120 Ohm, the second variable resistance VR2 is from about 18 to about 22 Ohm, and the third variable resistance VR3 is from about 18 to about 22 Ohm.

Figure 7:
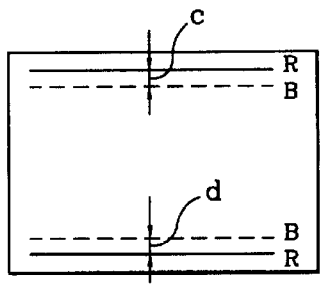
FIGS. 7 through 9 are explanatory diagrams of YV mis-convergence pattern on a screen.
Figure 9:
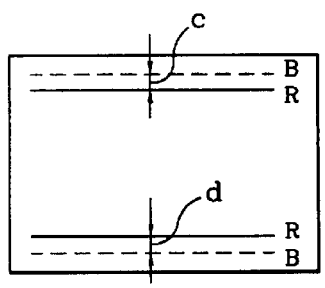
Figure 11:
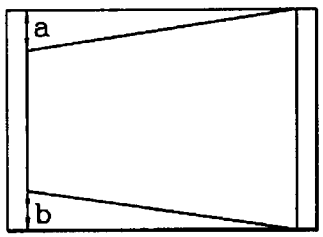
FIGS. 11 through 13 are explanatory diagrams of geometric distortion pattern on a screen.
Figure 13:
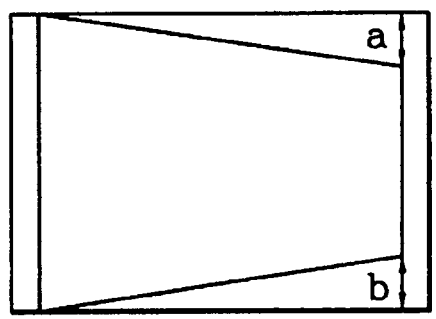
Figure 14:
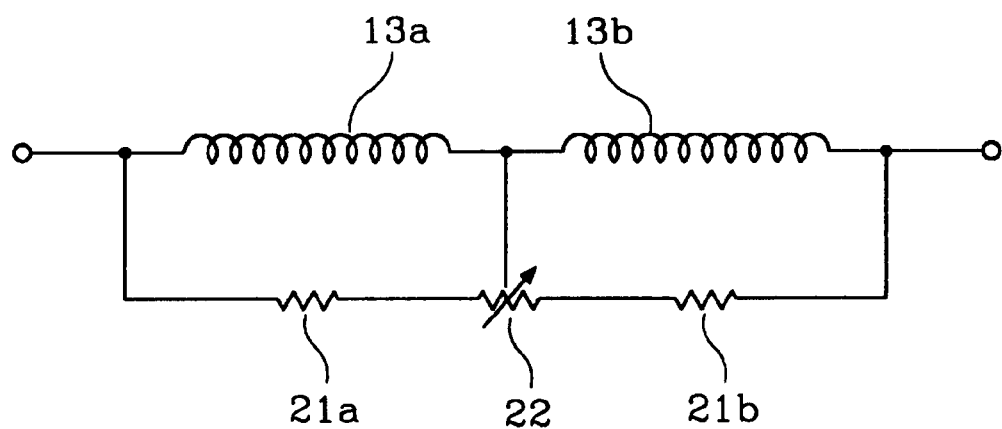
FIG. 14 is an auxiliary circuit diagram of YV mix-convergence in a saddle-saddle type deflection type yoke according to an embodiment of a conventional apparatus.
Figure 15:
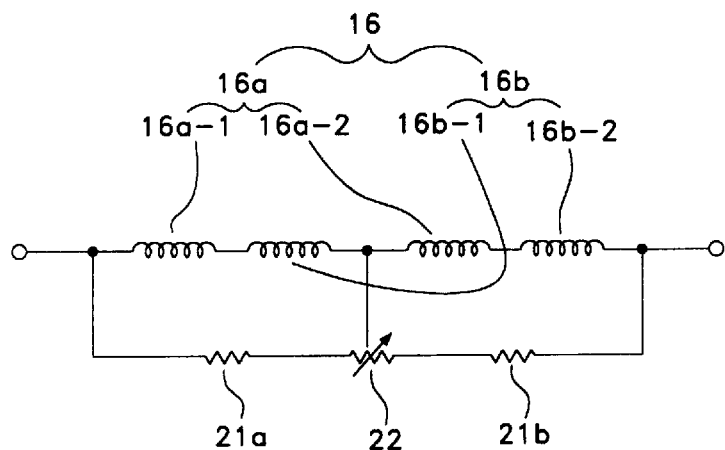
FIG. 15 is an auxiliary circuit diagram of YV mix-convergence in a saddle-toroidal type deflection type yoke according to an embodiment of a conventional apparatus.
Figure 16:
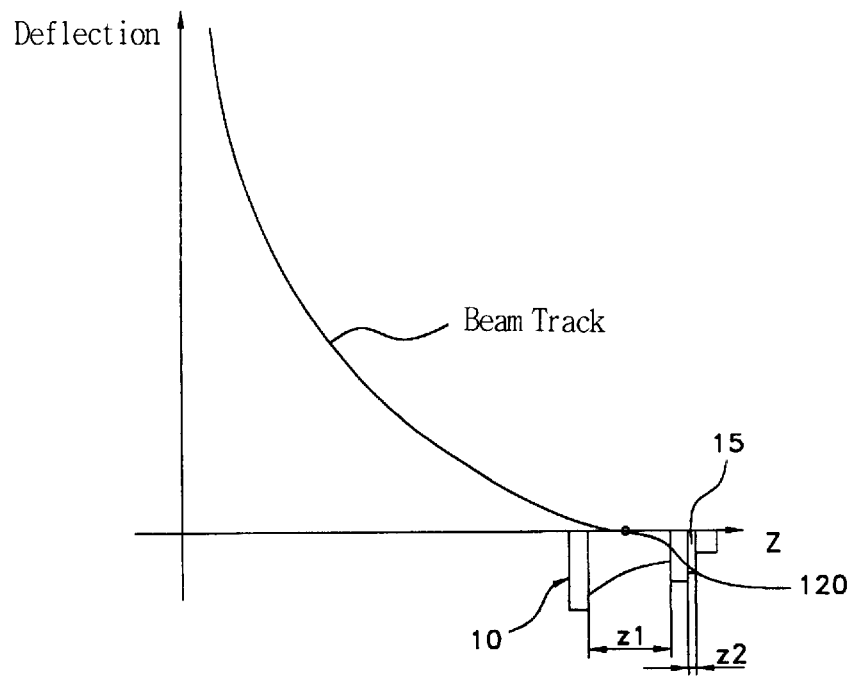
FIG. 16 is an explanatory diagram of a relationship between a beam track and a deflection due to a deflection yoke.

According to the preferred embodiment of the present invention described above, if a maximum variable for correcting geometric distortion by the distortion correction portion 40 is (a+b)/2, as illustrated in FIGS. 11 and 13, the value here is (a+b)/2≅1 mm, which is almost twice higher than that of the conventional method. Moreover, a maximum variable for correction YV mis-convergence by the mis-convergence correction portion 70 is (c+d)/2, as illustrated in FIGS. 7 and 9, the value here is (c+d)/2≅0.8 mm, and no geometric distortion exists in this case.

The current adjusting resistance is in a range of from 5 to 10Ω.

It is now explained how the apparatus for correcting a mis-convergence and G/D in a deflection yoke using a variable resistance according to the preferred embodiment of the present invention.

Figure 12:
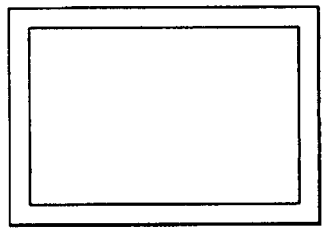

First of all, in case that a right side magnetic field generated by a right vertical deflection coil 13b is stronger than a left side magnetic field generated by a left vertical deflection coil 13a, causing G/D as shown in FIG. 11, by adjusting a first variable resistance VR1 in a way to adjust the current flowing in the left vertical deflection coil 13a, the magnetic field around the left side is compensated to be equal to the right side magnetic field generated by the right vertical deflection coil 13b, thereby correcting G/D as shown in FIG. 12.

On the other hand, G/D as shown in FIG. 13 can be occurred because the left side magnetic field generated by the left vertical deflection coil 13a is stronger than the right side magnetic field generated by the right vertical deflection coil 13b. In this case, similar to the above, by adjusting a first variable resistance VR1 in a way to adjust the current flowing in the right vertical deflection coil 13a, the magnetic field around the right side is compensated to be equal to the left side magnetic field generated by the left vertical deflection coil 13b, thereby correcting G/D as shown in FIG. 12.

Figure 10:
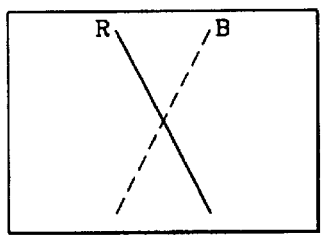
FIG. 10 is a diagram illustrating YHC mis-convergence pattern on a screen.

Therefore, YHC mis-convergence shown in FIG. 10 can be successfully corrected by correcting G/D using the first variable resistance VR1, and adjusting the current flowing in the first and second comma-free coils 51 and 52 and the third and fourth comma-free coils 53 and 54, respectively. FIG. 10 illustrates a case that the current flowing in the first and second comma-free coils 51 and 52 is relatively higher than that flowing in the third and fourth comma-free coils 53 and 54, thereby causing the deflection magnetic field at the upper portion is stronger. In this case, the YHC mis-convergence can be easily corrected by compensating the current flowing in the third and fourth comma-free coils 53 and 54, making the deflection magnetic fields at the upper and lower portions the same. Meanwhile, if the deflection magnetic field at the lower portion is stronger, the YHC mis-convergence could be corrected by adjusting the second variable resistance VR2.

As explained above, G/D and YHC mis-convergence are corrected by using the first variable resistance VR1 and the second variable resistance VR2, and as for YV mis-convergence illustrated in FIGS. 7 and 9, the third variable resistance VR3 is used to adjust the current flowing in the fifth and sixth comma-free coils 55 and 56, respectively.

First of all, the YV mis-convergence illustrated in FIG. 7 occurs when the right side magnetic field is stronger, so the left side magnetic field should be complemented to correct the mis-convergence. Therefore, by adjusting the third variable resistance VR3, the current flowing in the sixth comma-free coil 56 is enhanced, which consequently enhances the magnetic field thereby.

Figure 8:
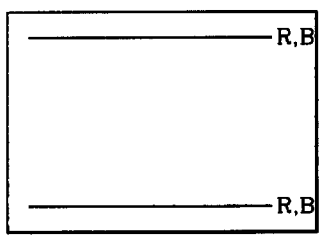

At this time, if the first through sixth comma-free coils 51–56 are wound to the same direction, the enhanced magnetic field by the sixth comma-free coil 56 cancels the magnetic fields generated by the second comma-free coil 52 at the upper right portion and the fourth comma-free coil 54 at the lower right portion. Thus, the right side magnetic field becomes weak while the left side magnetic field is enhanced. In this way, the left side and right side magnetic fields are equalized and the YV mis-convergence is corrected as shown in FIG. 8.

The YV mis-convergence illustrated in FIG. 9 occurs when the left side magnetic field is stronger, so the right side magnetic field should be complemented to correct the mis-convergence. Therefore, by adjusting the third variable resistance VR3, the current flowing in the fifth comma-free coil 55 is enhanced, which consequently enhances the magnetic field thereby.

Figures 23, 24:
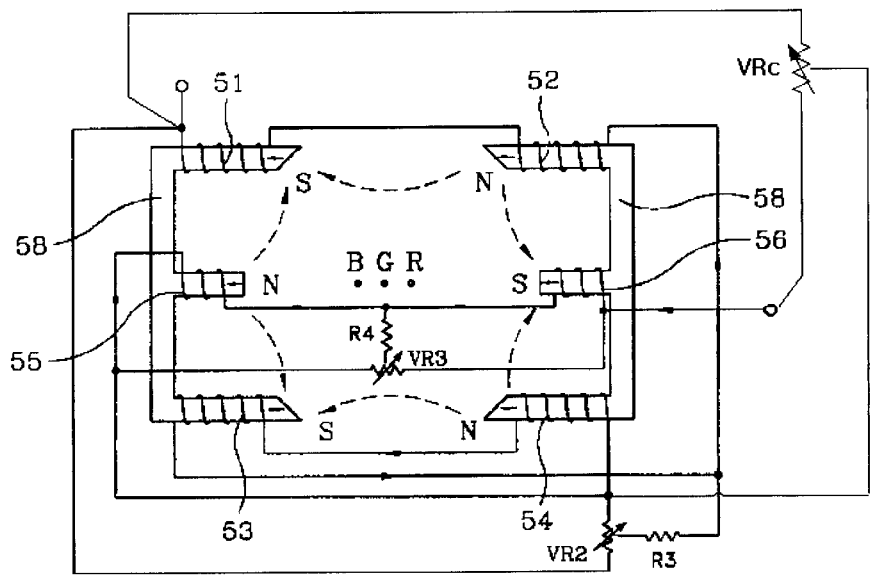
FIG. 23 is a schematic diagram illustrating a comma-free coil in connection with FIG. 21.
FIG. 24 is a experimental data table of an apparatus for complementing mis-convergence and geometric distortion of a deflection yoke using a variable resistance shown in FIG. 21.

Here, if the first through sixth comma-free coils 51–56 are wound to the same direction, six electrode magnetic fields are generated on an E-shaped magnetic member as shown in FIG. 23. And, the enhanced magnetic field by the fifth comma-free coil 55 cancels the magnetic fields generated by the first comma-free coil 51 at the upper left portion and the third comma-free coil 53 at the lower left portion. Thus, the left side magnetic field becomes weak while the right side magnetic field is enhanced. In this way, the left side and right side magnetic fields are equalized and the YV mis-convergence is corrected as shown in FIG. 8.

After the above-described mis-convergence is corrected, VCR mis-convergence correction is proceded by adjusting a current adjusting variable resistance VRc illustrated in FIG. 23. If it is necessary to narrow VCR to correct the VCR mis-convergence, that is, in order to narrow the distance to G-beam from R, B-beams, because it being located in outer side of R, B-beams, the current adjusting variable resistance VRc is adjusted, thereby magnifying the current flowing in the first through fourth comma-free coils 51–54 to be greater than the current flowing in the fifth and sixth comma-free coils 55 and 56.

On the other hand, if it is necessary to make VCR wide to correct the VCR mis-convergence, that is, in order to increase the distance to G-beam from R, B-beams, because it being located in inner side of R, B-beams, the current adjusting variable resistance VRc is adjusted, thereby reducing the current flowing in the first through fourth comma-free coils 51–54 to be less than the current flowing in the fifth and sixth comma-free coils 55 and 56.

The improved VCR mis-convergence by varying a current adjusting variable resistance VRc is more explicitly described through property change examination data shown in FIG. 24.

To maximize the effect of improving VCR mis-convergence, an application target should be limited within CCW or CW below 70°.

Figure 26:
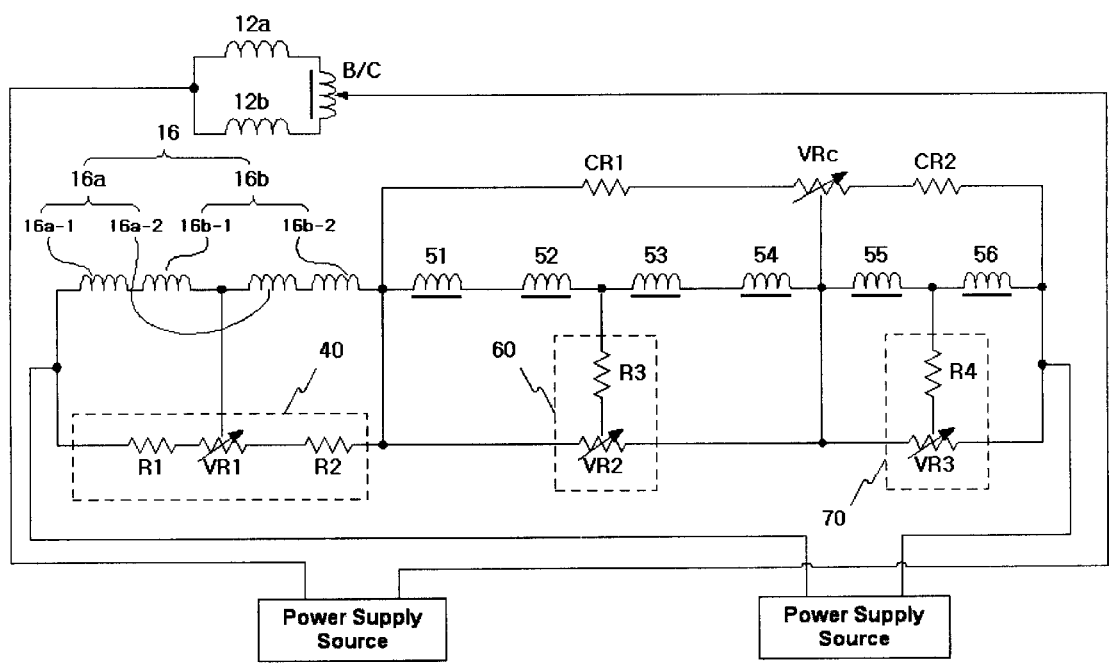
FIG. 26 is an illustrating diagram of a saddle-toroidal type deflection yoke to which the embodiment shown in FIG. 22 is applied.

However, in order to take an advantage of using the variable resistance VRc in a full range, appropriate CR1 and CR2 can be added as shown in FIG. 26.

Figure 25:
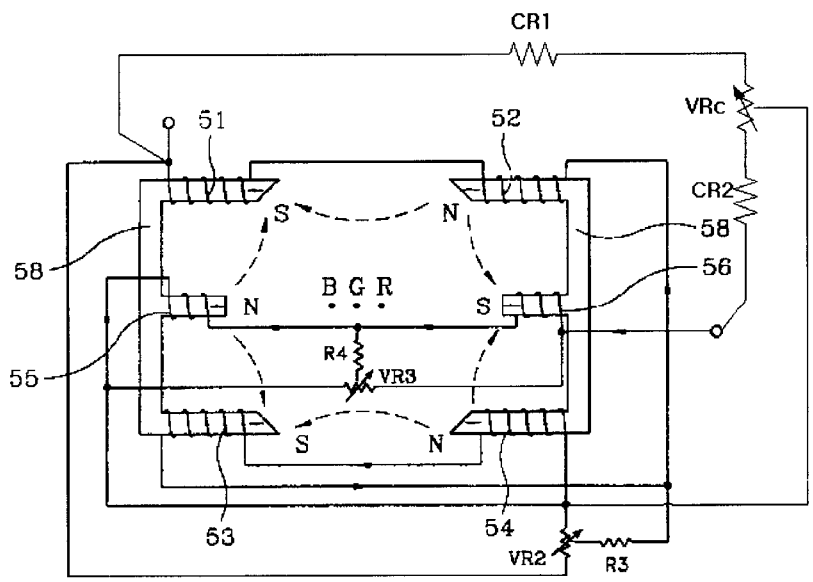
FIG. 25 is a schematic diagram illustrating a comma-free coil in connection with FIG. 22.

FIG. 25 is a diagram illustrating a configuration of a comma-free coil according to an embodiment shown in FIG. 22.

FIG. 26 is an auxiliary circuit diagram of an apparatus for correcting a mis-convergence and G/D in a saddle-toroidal type deflection yoke according to another embodiment of the present invention. Here, only a vertical deflection coil is explained since the rest of the configuration is the identical with that of the embodiment shown in FIG. 22.

In the FIG. 26, the upper left vertical deflection coil 16a-1, lower left vertical deflection coil 16b-1, upper right deflection coil 16a-2, and lower right vertical deflection coil 16b-2 are serially connected in the order. Also, to the upper and lower left deflection coils 16a-1 and 16b-1, and the upper and lower right deflection coils 16a-2 and 16b-2, connected in parallel is two fixed resistance R1 and R2 and G/D adjusting portion 40 comprising a variable resistance VR1.

The G/D adjusting portion 40 in FIG. 26 has the same configuration with that of G/D adjusting portion 40 in FIG. 22. In other words, G/D illustrated in FIG. 11 or 13 is corrected to be the one shown in FIG. 12, by adjusting the variable resistance VR1 to adjust the current flowing in the deflection coils 16a-1 and 16b-1 wound around the upper and lower left portions, and in the deflection coils 16a-2 and 16b-2 wound around the upper and lower right portions, respectively, which consequently adjusts relative magnetic fields in the left and right portions.

Although an embodiment of a saddle-saddle type deflection yoke is illustrated in FIGS. 21 and 22, but a saddle-toroidal type deflection yoke is illustrated in FIG. 26 only, the saddle-toroidal type deflection yoke like the saddle-saddle type deflection yoke has two kinds of embodiments.

In conclusion, as for the products associated with VCR (Vertial Green) properties, an apparatus for correcting a mis-convergence and geometric distortion in a deflection yoke using a variable resistance according to the present invention provides a more convenient way to adjust VCR by adjusting the current flowing in a comma-free coil using a variable resistance, instead of attaching a magnetic member as in the conventional method.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for correcting a mis-convergence and geometric distortion in a deflection yoke using a variable resistance, the apparatus comprising:

a conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a left vertical deflection coil and a right vertical deflection coil installed to be electrically connected to each other at an upper and lower portions of outer periphery of the screen portion in the coil separator;

a conical-shaped ferrite core installed at outer periphery of the screen portion in the coil separator to enhance a magnetic field of the vertical deflection coil;

a plurality of comma-free coils installed at the neck portion of the coil separator to be electrically connected to the vertical deflection coil for generating a pincushion magnetic field, thereby canceling a barrel magnetic field generated by the left and right vertical deflection coils;

a distortion adjusting portion for correcting geometric distortion on a screen by adjusting a relative current flowing in the left and right vertical deflection coils and thereby, adjusting a relative magnetic field in the left and right sides;

a first convergence adjusting portion for correcting a vertical mis-convergence on a screen by adjusting a relative current flowing in the comma-free coils at the middle left portion and the middle right portion and thereby, adjusting a relative magnetic field in the left and right sides;

a second convergence adjusting portion for correcting a horizontal mis-convergence on a screen by adjusting a relative current flowing in the comma-free coils at the upper portion and the lower portion and thereby, adjusting a relative magnetic field in the upper and lower sides; and a vertical center raster mis-convergence adjusting portion, comprising variable resistance connected to the comma-free coils in parallel, and fixed resistance connected to a common contact point of the left and right comma-free coils and a moving electrode of the variable resistance.

2. The apparatus of claim 1, wherein the variable resistance in the vertical center raster mis-convergence adjusting portion is in a range of from 5 to 10Ω.

3. An apparatus for correcting a mis-convergence and geometric distortion in a deflection yoke using a variable resistance, the apparatus comprising:

a conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a left vertical deflection coil and a right vertical deflection coil installed to be electrically connected to each other at an upper and lower portions of outer periphery of the screen portion in the coil separator;

a conical-shaped ferrite core installed at outer periphery of the screen portion in the coil separator to enhance a magnetic field of the vertical deflection coil;

a plurality of comma-free coils installed at the neck portion of the coil separator to be electrically connected to the vertical deflection coil for generating a pincushion magnetic field, thereby canceling a barrel magnetic field generated by the left and right vertical deflection coils;

a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising variable resistance connected to the comma-free coils in parallel, and fixed resistance connected to a common contact point of the left and right comma-free coils and a moving electrode of the variable resistance.

4. The apparatus of claim 3, wherein the variable resistance connected to the comma-free coils in parallel, and fixed resistance connected to a common contact point of the left and right comma-free coils and a moving electrode of the variable resistance.

5. An apparatus for correcting a mis-convergence and geometric distortion in a deflection yoke using a variable resistance, the apparatus comprising:

conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a left vertical deflection coil and a right vertical deflection coil installed to be electrically connected to each other at an upper and lower portions of outer periphery of the screen portion in the coil separator;

a conical-shaped ferrite core installed at outer periphery of the screen portion in the coil separator to enhance a magnetic field of the vertical deflection coil;

a plurality of comma-free coils installed at the neck portion of the coil separator to be electrically connected to the vertical deflection coil for generating a pin-cushion magnetic field, thereby canceling a barrel magnetic field generated by the left and right vertical deflection coils;

a distortion adjusting portion for correcting geometric distortion on a screen by adjusting a relative current flowing in the left and right vertical deflection coils and thereby, adjusting a relative magnetic field in the left and right sides;

a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising variable resistance connected to the comma-free coils in parallel, and fixed resistance connected to a common contact point of the left and right comma-free coils and a moving electrode of the variable resistance.

6. The apparatus of claim 5, wherein the variable resistance in the vertical center raster is in a range of from 5 to 10Ω.

7. An apparatus for correcting a mis-convergence and geometric distortion in a deflection yoke using a variable resistance, the apparatus comprising:

a conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a conical-shaped ferrite core installed at outer periphery of the screen portion in the coil separator to enhance a magnetic field of the vertical deflection coil;

upper and lower left vertical deflection coils and upper and lower right vertical deflection coils wound around the ferrite core to be electrically connected for generating vertical deflection magnetic fields at the upper and lower portions;

a plurality of comma-free coils installed at the neck portion of the coil separator to be electrically connected to the vertical deflection coil for generating a pin-cushion magnetic field, thereby canceling a barrel magnetic field generated by the left and right vertical deflection coils;

a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising variable resistance connected to the comma-free coils in parallel, and fixed resistance connected to a common contact point of the left and right comma-free coils and a moving electrode of the variable resistance.

8. The apparatus of claim 7, wherein the variable resistance in the vertical center raster is in a range of from 5 to 10Ω.

9. An apparatus for correcting a mis-convergence and geometric distortion in a deflection yoke using a variable resistance, the apparatus comprising:

a conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a left vertical deflection coil and a right vertical deflection coil installed to be electrically connected to each other at an upper and lower portions of outer periphery of the screen portion in the coil separator;

a conical-shaped ferrite core installed at outer periphery of the screen portion in the coil separator to enhance a magnetic field of the vertical deflection coil;

a plurality of comma-free coils installed at the neck portion of the coil separator to be electrically connected to the vertical deflection coil for generating a pin-cushion magnetic field, thereby canceling a barrel magnetic field generated by the left and right vertical deflection coils;

a distortion adjusting portion for correcting geometric distortion on a screen by adjusting a relative current flowing in the left and right vertical deflection coils and thereby, adjusting a relative magnetic field in the left and right sides;

a first convergence adjusting portion for correcting a vertical mis-convergence on a screen by adjusting a relative current flowing in the comma-free coils at the middle left portion and the middle right portion and thereby, adjusting a relative magnetic field in the left and right sides;

a second convergence adjusting portion for correcting a horizontal mis-convergence on a screen by adjusting a relative current flowing in the comma-free coils at the upper portion and the lower portion and thereby, adjusting a relative magnetic field in the upper and lower sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

10. The apparatus of claim 9, wherein the variable resistance in the vertical center raster is in a range of from 5 to 10Ω.

11. An apparatus for correcting a mis-convergence and geometric distortion in a deflection yoke using a variable resistance, the apparatus comprising:

a conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a left vertical deflection coil and a right vertical deflection coil installed to be electrically connected to each other at an upper and lower portions of outer periphery of the screen portion in the coil separator;

a conical-shaped ferrite core installed at outer periphery of the screen portion in the coil separator to enhance a magnetic field of the vertical deflection coil;

a plurality of comma-free coils installed at the neck portion of the coil separator to be electrically connected to the vertical deflection coil for generating a pincushion magnetic field, thereby canceling a barrel magnetic field generated by the left and right vertical deflection coils;

a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

12. The apparatus of claim 11, wherein the variable resistance in the vertical center raster is in a range of from 5 to 10Ω.

13. An apparatus for correcting a mis-convergence and geometric distortion in a deflection yoke using a variable resistance, the apparatus comprising:

a conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a left vertical deflection coil and a right vertical deflection coil installed to be electrically connected to each other at an upper and lower portions of outer periphery of the screen portion in the coil separator;

a conical-shaped ferrite core installed at outer periphery of the screen portion in the coil separator to enhance a magnetic field of the vertical deflection coil;

a plurality of comma-free coils installed at the neck portion of the coil separator to be electrically connected to the vertical deflection coil for generating a pincushion magnetic field, thereby canceling a barrel magnetic field generated by the left and right vertical deflection coils;

a distortion adjusting portion for correcting geometric distortion on a screen by adjusting a relative current flowing in the left and right vertical deflection coils and thereby, adjusting a relative magnetic field in the left and right sides;

a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

14. The apparatus of claim 13, wherein the variable resistance in the vertical center raster is in a range of from 5 to 10Ω.

15. An apparatus for correcting a mis-convergence and geometric distortion in a deflection yoke using a variable resistance, the apparatus comprising:

a conical-shaped coil separator including a neck portion and a screen section;

an upper horizontal deflection coil and a lower horizontal deflection coil installed to be electrically connected to each other at an upper and lower portions of inner periphery of the screen portion in the coil separator;

a conical-shaped ferrite core installed at outer periphery of the screen portion in the coil separator to enhance a magnetic field of the vertical deflection coil;

upper and lower left vertical deflection coils and upper and lower right vertical deflection coils wound around the ferrite core to be electrically connected for generating vertical deflection magnetic fields at the upper and lower portions;

a plurality of comma-free coils installed at the neck portion of the coil separator to be electrically connected to the vertical deflection coil for generating a pincushion magnetic field, thereby canceling a barrel magnetic field generated by the left and right vertical deflection coils;

a first convergence adjusting portion for correcting a vertical mis-convergence on a screen by adjusting a relative current flowing in the comma-free coils at the middle left portion and the middle right portion and thereby, adjusting a relative magnetic field in the left and right sides; and a vertical center raster mis-convergence adjusting portion, comprising a first current adjusting resistance having one end connected to a contact point of a right vertical deflection coil and a left comma-free coil; a second current adjusting resistance having one end connected to a contact point of a right comma-free coil and a power supply source; a variable resistance connected to a common contact point of the left and right comma-free coils and a moving electrode of the variable resistance, having one end connected to the other end of the first current adjusting resistance and another end connected to the other end of the second current adjusting resistance.

16. The apparatus of claim 15, wherein the variable resistance in the vertical center raster is in a range of from 5 to 10Ω.

* * * * *